United States Patent [19]
Suzuki et al.

[11] Patent Number: 5,861,927
[45] Date of Patent: Jan. 19, 1999

[54] LIQUID CRYSTAL DISPLAY DEVICE WITH UNIFORM CHARACTERISTICS OVER WHOLE DISPLAY AREA

[75] Inventors: Toshihiro Suzuki; Tetsuya Kobayashi; Tetsuya Hamada; Hisashi Yamaguchi, all of Kawasaki, Japan

[73] Assignee: Fujitsu Limited, Kawasaki, Japan

[21] Appl. No.: 57,058

[22] Filed: Apr. 8, 1998

[30] Foreign Application Priority Data

Apr. 28, 1997 [JP] Japan ................................. 9-111576

[51] Int. Cl.$^6$ ................................................ G02F 1/1335
[52] U.S. Cl. ............................................................ 349/5
[58] Field of Search .................... 349/61, 67, 5, 349/8

[56] References Cited

U.S. PATENT DOCUMENTS

| | | | |
|---|---|---|---|
| 5,491,525 | 2/1996 | Yamasaki et al. | 349/5 |
| 5,612,797 | 3/1997 | Clarke | 349/5 |
| 5,703,663 | 12/1997 | Fujioka et al. | 349/5 |

*Primary Examiner*—William L. Sikes
*Assistant Examiner*—James Dudek
*Attorney, Agent, or Firm*—Greer, Burns, & Crain, Ltd.

[57] ABSTRACT

A liquid crystal display device includes: a liquid crystal spatial modulating element holding a liquid crystal layer between a pair of parallel substrates, wherein transmission of light incident upon the liquid crystal layer along an incidence direction tilted to a predetermined direction from a normal to the substrates takes a local minimum as a voltage applied to the liquid crystal layer is changed, and the voltage at the local minimum changes as the incidence direction is changed; an illumination optical system for supplying illumination light generally over a whole surface of the liquid crystal spatial modulating element along incidence direction or directions tilted to the predetermined direction; and a driver circuit capable of applying a voltage across the liquid crystal layer, the voltage being generally equal to a voltage which provides the local minimum of the transmission with respect to the illumination light. The liquid crystal display device has uniform display characteristics over a display screen.

20 Claims, 9 Drawing Sheets

LIQUID CRYSTAL DISPLAY DEVICE WITH UNIFORM CHARACTERISTICS OVER WHOLE DISPLAY AREA

This application is based on Japanese Patent Application No. 9-111576 filed on Apr. 28, 1997, the entire contents of which are incorporated herein by reference.

BACKGROUND OF THE INVENTION a) Field of the Invention

The present invention relates to a liquid crystal display device having the characteristics that light transmission changes with an angle of incidence of light.

b) Description of the Related Art

A liquid crystal display device controls orientation of liquid crystal molecules to achieve a desired display. An orientation method such as rubbing is used to orient liquid crystal molecules in a desired direction under the conditions that a drive voltage is not applied to the liquid crystal layer. For this rubbing, an alignment film such as polyimide is coated on a substrate, and the surface of the film is rubbed with a rubbing cloth or the like in a predetermined direction.

Liquid crystal molecules are generally oriented in the rubbing direction and have pre-tilt raising their easy axes on the side of the rubbing end point from the substrate surface relative to the rubbing start side.

The rubbing direction can therefore be dealt with as a vector amount. The direction of a vector is defined, for example, as a direction from the rubbing start point toward the rubbing end point.

A typical orientation structure of a liquid crystal layer is a twisted nematic structure. Rubbing is performed usually in two crossing directions on a pair of substrates sandwiching the liquid crystal layer. Liquid crystal molecules have a predetermined twist such as 90° from one substrate toward the other substrate in the plane parallel to the substrate surfaces.

If a pair of polarizers having crossed absorption axes (or transmission axes) is mounted outside of the liquid crystal layer, the state without an applied voltage becomes a light transmission state (on), and the state with an applied voltage becomes a light shielding state (off). This is called normally-on (normally-white).

If a pair of polarizers having parallel absorption axes (or transmission axes) is used, the state without an applied voltage becomes a light shielding state (off), and the state with an applied voltage becomes a light transmission state (on). This is called normally-off (normally-black).

As a method of displaying an image by using a liquid crystal layer, a direct view type and a projection type are known. With the former, a viewer sees an image directly at the liquid crystal layer, and with the latter, a viewer sees an image formed by projecting onto a screen light passed through the liquid crystal layer.

Figure 9A:
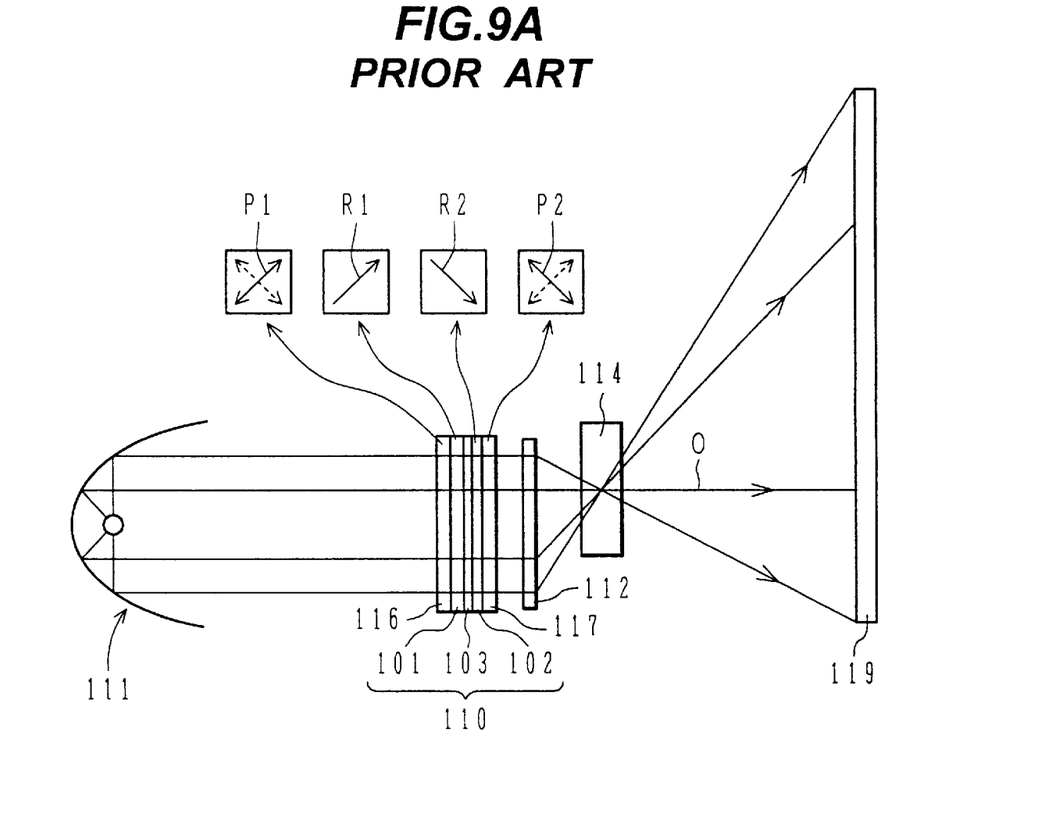
FIGS. 9A and 9B are a schematic cross sectional view and a graph illustrating a liquid crystal display device according to prior art.
Figure 9B:
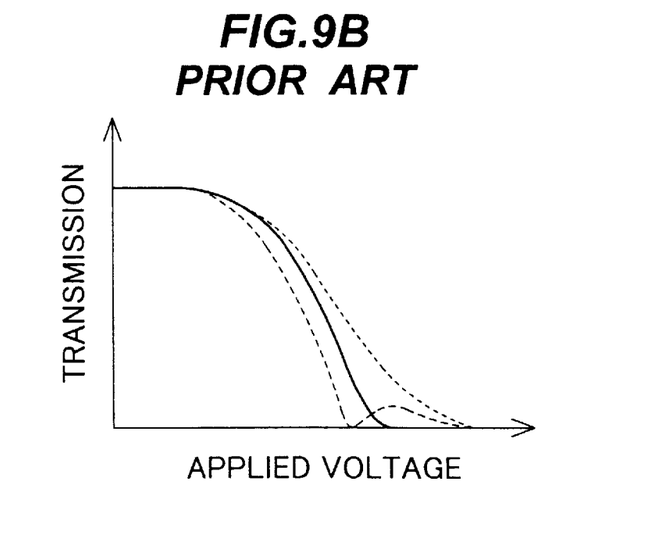

FIGS. 9A and 9B are a schematic diagram and a graph illustrating a projection type twisted nematic liquid crystal display device according to prior art. In FIG. 9A, a pair of glass substrates 101 and 102 sandwiching a liquid crystal layer 103 constitutes a liquid crystal display element (liquid crystal spatial modulating element) 110. Drive elements and wirings are formed on the inner surfaces of the glass substrates 101 and 102, and alignment films subjected to rubbing are coated on the glass substrates.

The rubbing directions are crossed on the two glass substrates as indicated by arrows R1 and R2, and take an angle of 45° relative to the horizontal and vertical directions. A pair of polarizers 116 and 117 are disposed outside of the liquid crystal display element 110. In this example, the polarizing axes P1 and P2 of the polarizers 116 and 117 are parallel (normally-on (normally-white) type) to the rubbing directions R1 and R2 on the adjacent glass substrates 101 and 102. The polarizing axes P1 and P2 may be crossed as indicated at R1 and R2 by broken lines (normally-off (normally black) type).

An illumination optical system 111 including a parabolic mirror and a point light source positioned at the focal point of the parabolic mirror, vertically supplies parallel light fluxes to the polarizer 116 and to liquid crystal display element 110. Light fluxes transmitted through the liquid crystal display element 110 and the polarizer 117 are converged by a field lens 112 and become incident upon a projecting lens 114. The projecting lens 114 enlarges and projects an image formed by the liquid crystal display element 110 upon a screen 119. An optical axis O of the projecting lens 114 is eccentric from the centers of the liquid crystal display element 110 and screen 119 in order to adjust the height of the screen 119.

FIG. 9B is a graph showing a relation between a voltage applied to the liquid crystal display element 110 and a transmission of light transmitted through the liquid crystal display element, the angle of light incident upon the liquid crystal display element 110 being used as a parameter. In the example shown in FIG. 9A, the state without an applied voltage to the liquid crystal display element 110 is the light transmission state with a highest transmission coefficient. As the voltage applied to the liquid crystal display element is increased, the transmission gradually lowers and finally becomes 0. The characteristics are indicated by a solid line in the graph of FIG. 9B.

If the light fluxes supplied to the liquid crystal display element 110 by the illumination optical system 111 contain flux components not perpendicular to the substrate surface, the transmission curve shown in FIG. 9B changes from the solid line T0 to a broken line T1 or a dot line T2.

If the direction of incident light changes from the horizontal direction shown in FIG. 9A to the lower side, the transmission curve shown in FIG. 9B changes to the broken line T1. In this case, the transmission lowers more rapidly than the perpendicular incidence, and after it takes a local minimum, it rises again and then lowers further.

If the direction of incident light changes from the horizontal direction shown in FIG. 9A to the upper side, the transmission curve shown in FIG. 9B changes to the dot line T2. Namely, as the applied voltage rises, the degree of lowering the transmission lowers, showing as a whole the lifted transmission curve.

If the direction of light fluxes incident upon the liquid crystal display element 110 broadens in an expanded area, the solid line, broken line and dot line transmission curves shown in FIG. 9B are present in a mixed way. Specifically, even if vertical incidence light can be almost shielded, light incident from the lower side or upper side cannot be shielded perfectly. Therefore, in order to provide a high contrast image, the angle of incidence is desired to be maintained vertical to the substrate surface of the liquid crystal display element.

As described above, it is possible to provide a liquid crystal display element having the uniform characteristics by applying incident light vertically to the liquid crystal display element. However, it is not easy to supply only vertical incidence light to the liquid crystal display element. Therefore, the contrast is limited to about 200 at a maximum in practice.

If the direction of incidence expands too broad, the contrast possibly changes on the display surface of a liquid crystal display element. For example, if the contrast cannot be maintained uniform over the whole display surface, undesired patterns such as striped patterns are formed when a black display is to be performed over the whole display surface.

SUMMARY OF THE INVENTION

It is an object of the present invention to provide a liquid crystal display device having uniform characteristics on a display surface.

It is another object of the present invention to provide a liquid crystal display device having a high contrast.

According to one aspect of the present invention, there is provided a liquid crystal display device, comprising: a liquid crystal spatial modulating element holding a liquid crystal layer between a pair of substrates, wherein a transmission of light incident upon the liquid crystal layer along an incidence direction tilted to a predetermined direction from a normal to the substrates takes a local minimum as a voltage applied to the liquid crystal layer is changed, and the voltage at the local minimum changes as the incidence direction is changed; an illumination optical system for supplying illumination light generally over a whole surface of the liquid crystal spatial modulating element along the incidence direction tilted to the predetermined direction; and a driver circuit capable of applying a voltage to the liquid crystal layer, the voltage being generally equal to a voltage which provides the illumination light with the local minimum of the transmission.

Since the liquid crystal spatial modulating element is used in which a transmission of light incident upon the liquid crystal layer along an incidence direction tilted to a predetermined direction from a normal to the substrates takes a local minimum as a voltage applied to the liquid crystal layer is changed, and since illumination light is supplied along the incidence direction tilted to the predetermined direction, only the characteristics having a uniform transmission change with the applied voltage can be utilized. Near the local minimum, the transmission takes a low value and does not change steeply so that a voltage in a range ensuring generally the same display characteristics can be applied.

By properly selecting the incidence direction of illumination light and applying a voltage generally equal to a voltage which provides a local minimum of a transmission to the liquid crystal layer, a liquid crystal display device having uniform optical characteristics over the whole display screen can be realized.

Since the voltage which provides a local minimum is lower than a voltage at which vertically incident illumination light becomes generally zero, the voltage for driving the liquid crystal spatial modulating element can be lowered.

As above, it is possible to provide a liquid crystal display device capable of realizing a uniform black display over the whole display screen.

It is also possible to drive a liquid crystal display element at a voltage lower than a voltage used when illumination light is vertically input to the liquid crystal display element.

DETAILED DESCRIPTION OF THE PREFERRED EMBODIMENTS

A liquid crystal display device according to an embodiment of the invention will be described with reference to FIGS. 1A to 1E.

Figure 1A:
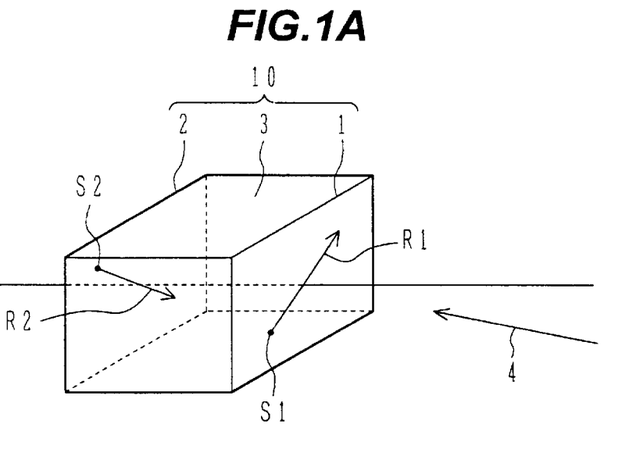
FIGS. 1A to 1E are a perspective view, a cross sectional view, and graphs respectively illustrating a liquid crystal display device according to an embodiment of the invention.
Figure 1B:
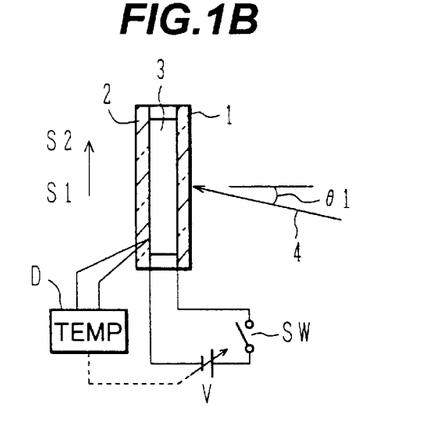

FIGS. 1A and 1B are a perspective view and a cross sectional view schematically showing the structure of a liquid crystal display element. A liquid crystal display element is constituted of a pair of glass substrate 1 and 2 sandwiching a liquid crystal layer 3. The liquid crystal display element has no spacer in the display (light transmitting) area. The inner surfaces of the glass substrates 1 and 2 are formed with electrodes, drive elements, filters and the like. The surfaces of the glass substrates 1 and 2 are covered with alignment films. The alignment films are rubbed in the directions indicated by arrows R1 and R2. The start point in the rubbing direction R1 on the light incidence side glass substrate 1 is indicated by S1, and the start point in the rubbing direction R2 on the light output side glass substrate 2 is indicated by S2.

A positive direction is defined as the direction from the start point S1 to start point S2 as projected onto a plane parallel to the glass substrates 1 and 2. Illumination light 4 is incident along the positive direction upon the incidence side glass substrate 1. The illumination light 4 has an angle $\theta 1$ relative to the horizontal direction (normal to the substrates) as shown in FIG. 1B.

Figure 1C:
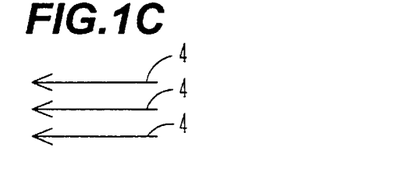
Figure 1D:
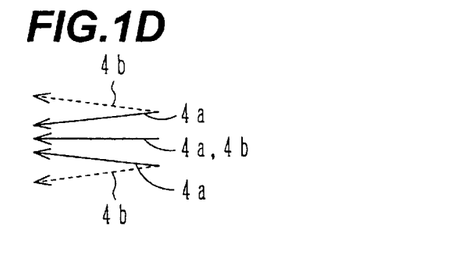

FIGS. 1C and 1D are plan views of incidence directions of the illumination light 4 as viewed from the upper position.

In the example shown in FIG. 1C, illumination light 4 has parallel fluxes and propagates in the direction slanted by the angle $\theta 1$ relative to the horizontal plane as shown in FIG. 1B. In the example shown in FIG. 1D, illumination light $4a$ has converged fluxes and illumination light $4b$ has diverged fluxes. Also in these cases, each of the illumination light fluxes $4a$ and $4b$ propagates in the direction slanted by the angle $\theta 1$ relative to the horizontal plane as shown in FIG. 1B when viewed sidewise.

By representing an angle of incidence in the horizontal plane by $\phi$ and an angle of incidence in the vertical plane by $\theta$ under the conditions that the substrates of the liquid crystal display element are disposed upright, the illumination light shown in FIG. 1C takes a constant negative value θ and the angle φ is 0, whereas the illumination light shown in FIG. 1D takes a constant negative value θ and the angle φ takes values in a range from a positive value to a negative value and the average thereof is 0.

How these parallel, converged, and diverged light fluxes incident upon a liquid crystal display element shown in FIGS. 1C and 1D are formed will be described with reference to FIGS. 2A to 2C.

Figure 2A:
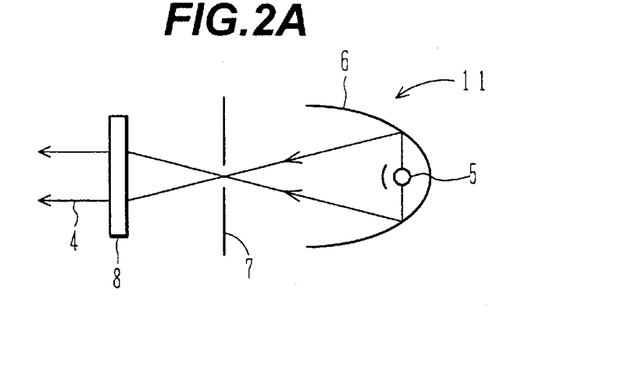
FIGS. 2A to 2D are schematic diagrams illustrating an illumination optical system for illuminating a liquid crystal display element.

FIGS. 2A and 2B illustrate how parallel light fluxes are formed. In FIG. 2A, a point light source 5 is located at the position spaced farther from a focal point of a parabolic mirror 6. Therefore, light radiated from the point light source 5 is reflected by the parabolic mirror 6 and transformed into converging light fluxes which propagate toward the opening of a slit 7. After passing through the opening, the diverging light fluxes are transformed into parallel light fluxes 4 by a lens 8.

Figure 2B:
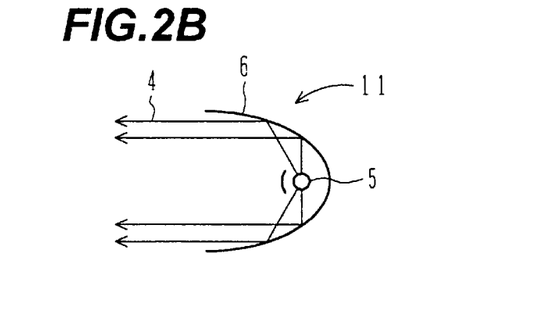

In FIG. 2B, a point light source 5 is located at the focal point of a parabolic mirror 6. Therefore, light radiated from the point light source 5 is reflected by the parabolic mirror 6 and transformed into parallel light fluxes 4.

In the examples shown in FIGS. 2A and 2B, a shielding plate is provided in order to shield light which is not directed to the parabolic mirror 11. Even if this shielding plate is not used, the light amount of fluxes different from parallel fluxes can be made low level if light at a position remote from the parabolic mirror 6 is used.

Figure 2C:
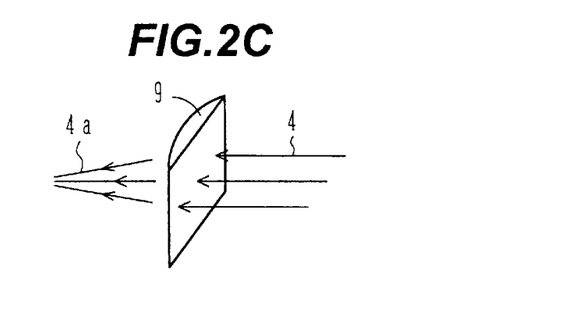

FIG. 2C shows a structure for transforming parallel light fluxes into converging or diverging light fluxes relative to one direction. Parallel light fluxes 4 enter a cylindrical lens 9 and are transformed into converging light fluxes 4a. If this convex cylindrical lens 9 is replaced by a concave lens, diverging light fluxes are formed. By using a cylindrical lens, a light progressing direction in the horizontal plane can be changed to thereby form parallel, converging or diverging light fluxes, without changing the light progressing direction in the vertical plane.

As shown in FIG. 1B, the electrodes and drive elements formed on the inner surfaces of the glass substrates 1 and 2 are supplied with a drive voltage from a power source V via a switch SW. The drive voltage V may be controlled while a temperature at the inner surfaces of the substrates is detected with a temperature sensor D or while irregular brightness of a display is visually sensed by an operator.

Figure 1E:
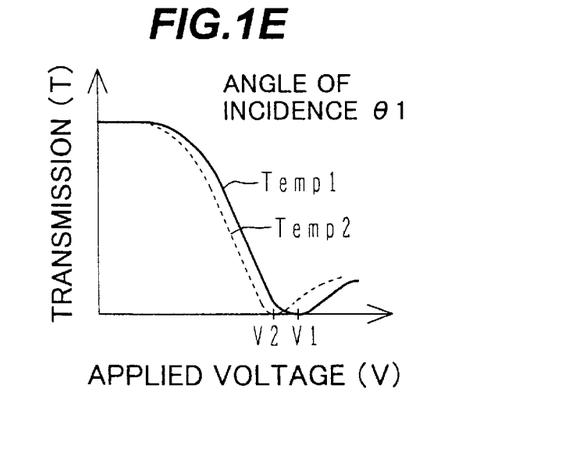

FIG. 1E is a graph showing a change in a transmission with an applied voltage of a liquid crystal display device. At a temperature Temp1, the transmission T lowers as the applied voltage V rises, it takes a local minimum at an applied voltage V1, and as the applied voltage is further raised, the transmission T again increases. These characteristics are satisfied when the angle of incidence is θ1.

Even if the same angle of incidence is used, the transmission curve changes if the temperature of the liquid crystal layer changes. For example, at a temperature Temp2 higher than the temperature Temp1, the transmission lowers more rapidly, takes a local minimum at a lower applied voltage V2, and increases again thereafter as the applied voltage is raised. At the temperature Temp2, therefore, the transmission takes a local minimum at the applied voltage V2.

Figure 3A:
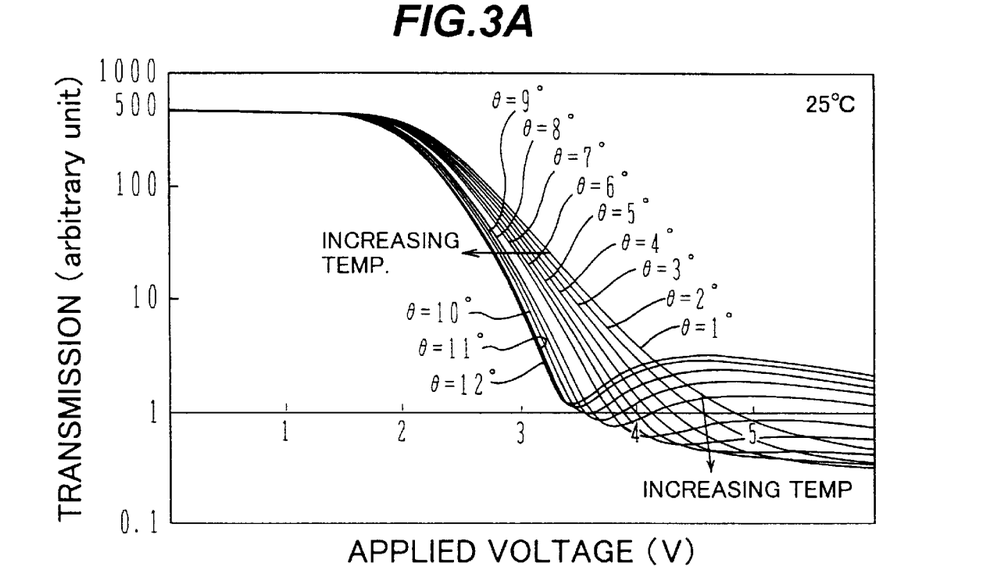
FIGS. 3A and 3B are graphs showing a change in a transmission as the angle of light incident upon a liquid crystal display element changes.
Figure 3B:
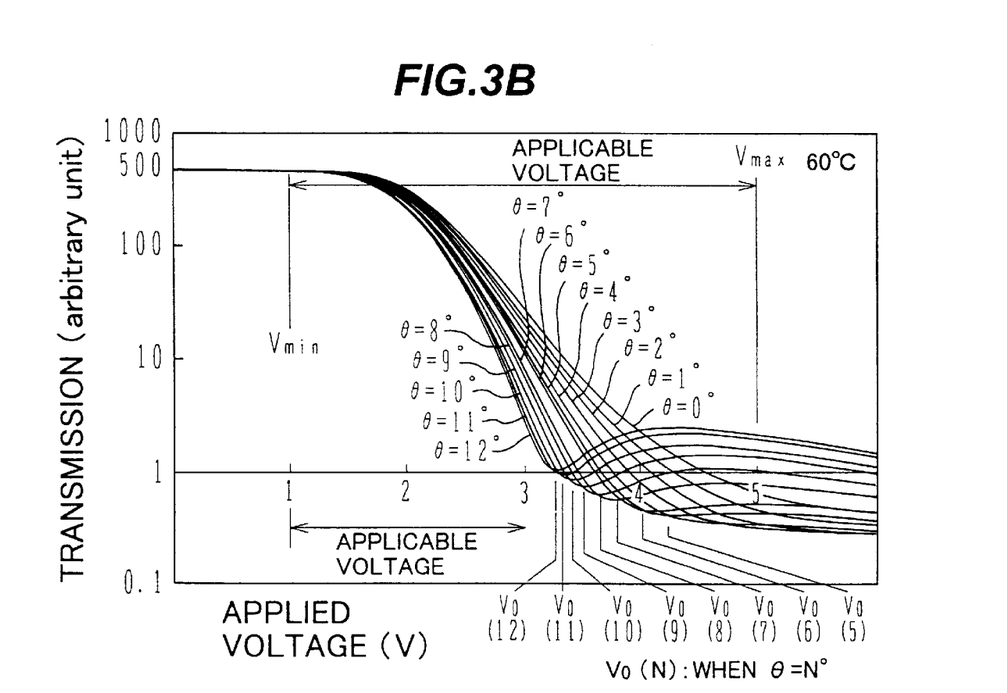

FIGS. 3A and 3B are graphs showing the detailed relation between an applied voltage of a liquid crystal display element and a transmission of light transmitting through the liquid crystal display element.

FIG. 3A shows the characteristics at 25° C. which indicate a change in the transmission curve as the angle of incidence changes at a pitch of 1° in the range from 0° to 12° relative to the horizontal plane. As the angle of incidence becomes large, the transmission lowers more rapidly and a local minimum occurs at a lower applied voltage.

FIG. 3B shows similar characteristics at 60° C. Although the way the transmission changes is generally the same as at 25° C., a degree of the change in the transmission and an applied voltage at the local minimum change with the temperature. Specifically, as the temperature rises, the transmission lowers more rapidly and the applied voltage at the local minimum of the transmission becomes lower.

The relations between the transmission and applied voltage shown in FIGS. 3A and 3B are sensitive to a vertical light progressing direction (angle θ), and relatively insensitive to a horizontal light progressing direction (angle φ). Therefore, as shown in FIG. 2C, even if converging or diverging light fluxes are used, the characteristics generally same as the transmission curves for parallel light fluxes can be obtained.

Figure 2D:
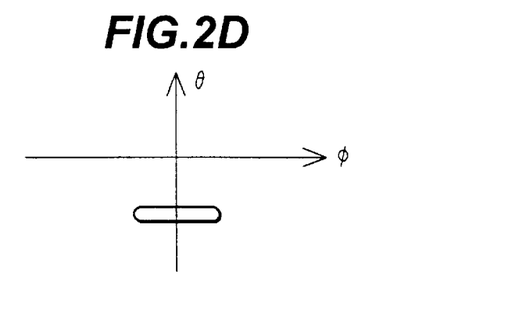

FIG. 2D is a schematic diagram illustrating the progressing direction of incident light fluxes broadened in an expanded area. The abscissa represents an angle of incidence φ in the horizontal plane, and the ordinate represents an angle of incidence θ in the vertical plane. As shown, even if the angle φ is broadened in an expanded area in the horizontal plane, the uniform characteristics shown in FIG. 1E can be obtained and a good black display can be achieved by properly selecting the applied voltage corresponding to the local minimum, if the angle θ in the horizontal plane is generally constant.

As shown in FIG. 1B, if the angle of incidence in the plane vertical to, including the normal to, the glass substrates of the liquid crystal display element is maintained to have a constant value θ1 and if a voltage corresponding to the local minimum transmission T is applied to the liquid crystal layer 3, the transmission can be made minimum.

If the temperature of the liquid crystal layer changes, the voltage to be applied is changed correspondingly for obtaining a good black display.

As described previously with reference to FIG. 9B, after the transmission takes a local minimum, it again rises. In this case, the applied voltage at which the local minimum occurs is lower than the applied voltage at which the local minimum for normal (vertical) incidence occurs. Therefore, as compared to normal incidence, the liquid crystal display device can be driven at a lower voltage.

In the above example, rubbing is performed in particular directions for the incidence side glass substrate and output side glass substrate. If the rubbing directions for the glass substrates on the incidence and output sides are reversed, the sign of the angle of incidence relative to the horizontal plane is inverted. Namely, the incidence light is propagated along a direction from the upper to lower side relative to the horizontal plane. It will be obvious for those skilled in the art that the incidence direction is tilted to a predetermined direction relative to a normal to the liquid crystal display element surface according to the configuration of the liquid crystal display device.

If the area of a liquid crystal display element is small, light fluxes incident upon the liquid crystal display element may be directly entered to a projecting lens to project an image onto the screen. If the area of a liquid crystal display element is large and an image is to be directly projected from the projecting lens, a large projecting lens is required.

Figure 4A:
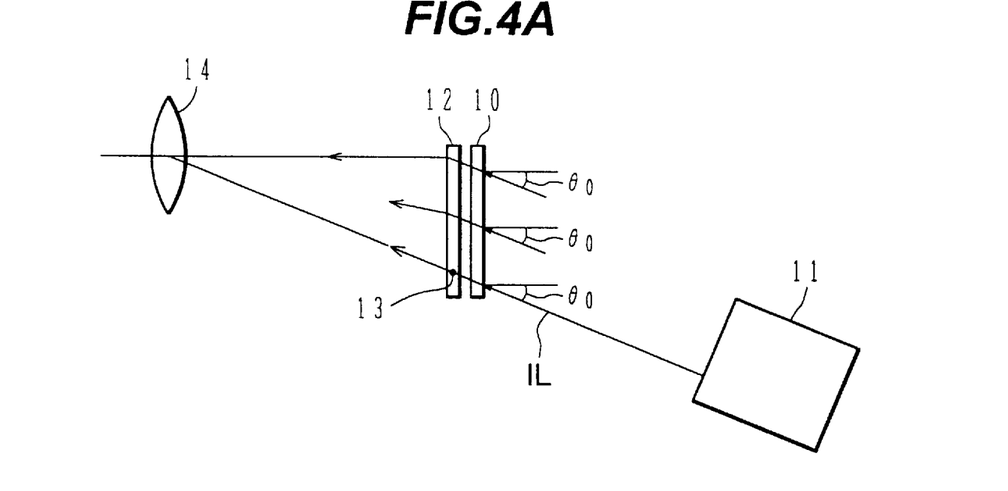
FIGS. 4A and 4B are a schematic cross sectional view illustrating a liquid crystal display device and a plan view of a field lens, according to an embodiment of the invention.
Figure 4B:
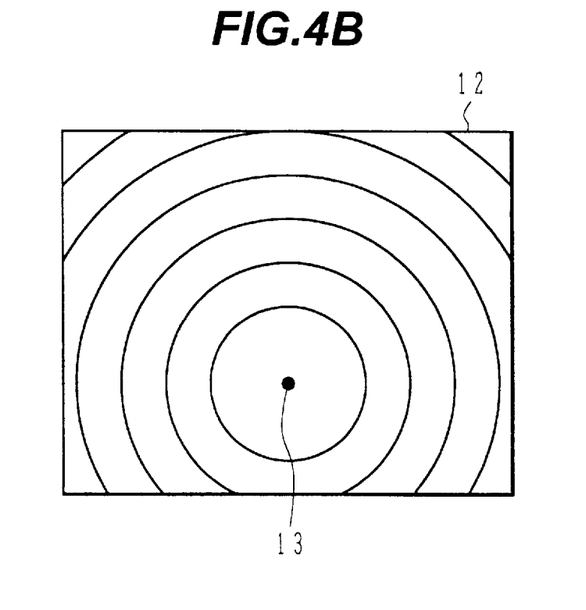

FIGS. 4A and 4B show the structure by which a large liquid crystal display element can be used without a large projecting lens.

Parallel light fluxes are supplied from an illumination light source 11 obliquely to a liquid crystal display element 10. Light fluxes IL output from the liquid crystal display element 10 are converged by a field lens 12 and supplied to a projecting lens 14 which projects an image onto a screen.

FIG. 4B shows the structure of a field lens 12 suitable for the application to the system shown in FIG. 4A. The field lens 12 is made of a Fresnel lens. Use of a Fresnel lens can provide a large area thin lens. By setting the center 13 of the field lens 12 at a lower position than the areal center of the lens as shown in FIG. 4B, it is possible to dispose the projecting lens 14 and liquid crystal display element 10 in parallel and to supply illumination light from the lower side to the liquid crystal display element 10.

Figure 5:
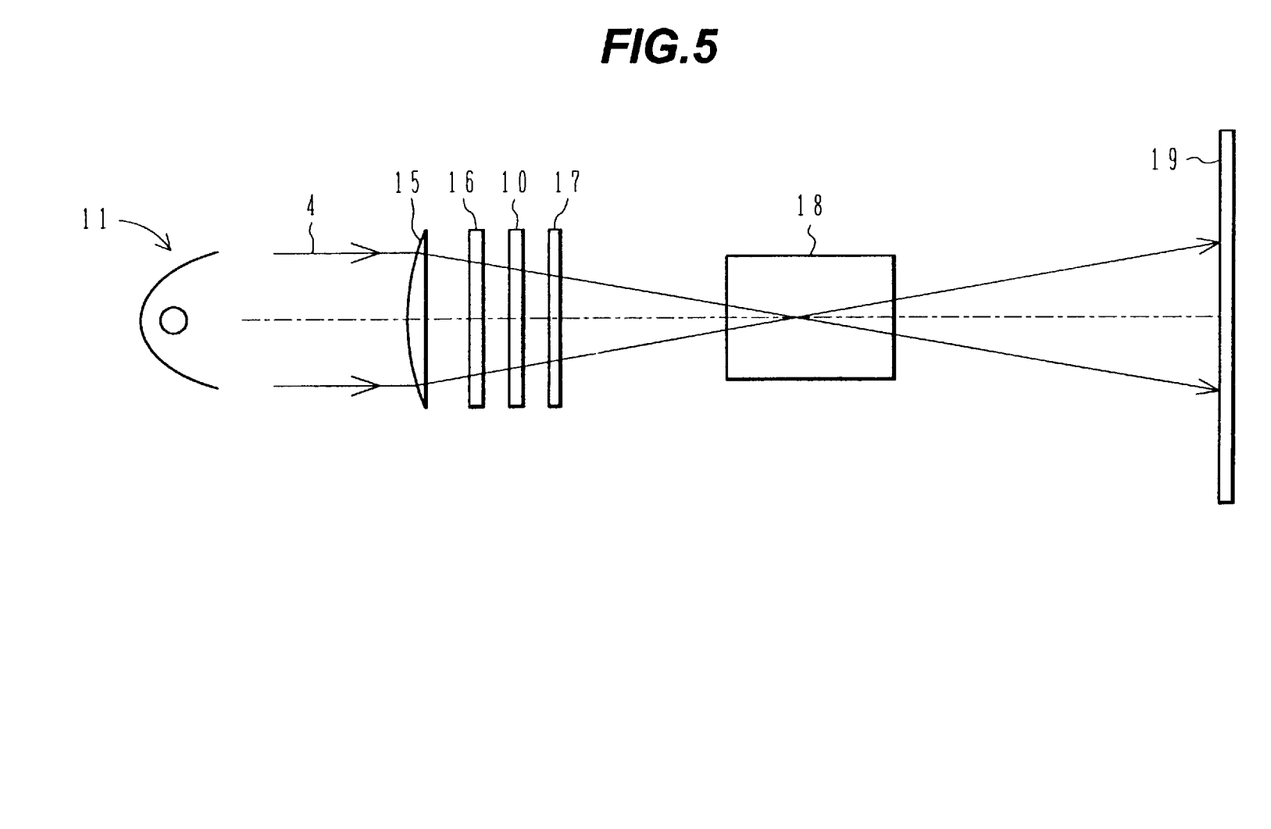
FIG. 5 is a schematic plan view showing the structure of a single plane type monochrome liquid crystal display device according to an embodiment of the invention.

FIG. 5 is a plan view showing the structure of a single plane type liquid crystal display device. Parallel light fluxes 4 are supplied from an illumination light source 11 to a condenser lens 15. The condenser lens 15 transforms the parallel light fluxes into converging light fluxes which are supplied to a lamination structure of a polarizer 16, a liquid crystal display element 10 and a polarizer (analyzer) 17. The liquid crystal display element 10 modulates incident light fluxes and outputs them to the polarizer 17. Spatially modulated image light is projected by a projecting lens 18 onto a screen 19. As described earlier, light incident upon the liquid crystal display element 10 is slanted in the direction toward the upper or lower side of the drawing sheet. If the liquid crystal display element 10 is equipped with a color filter, a color image can be displayed.

Figure 6:
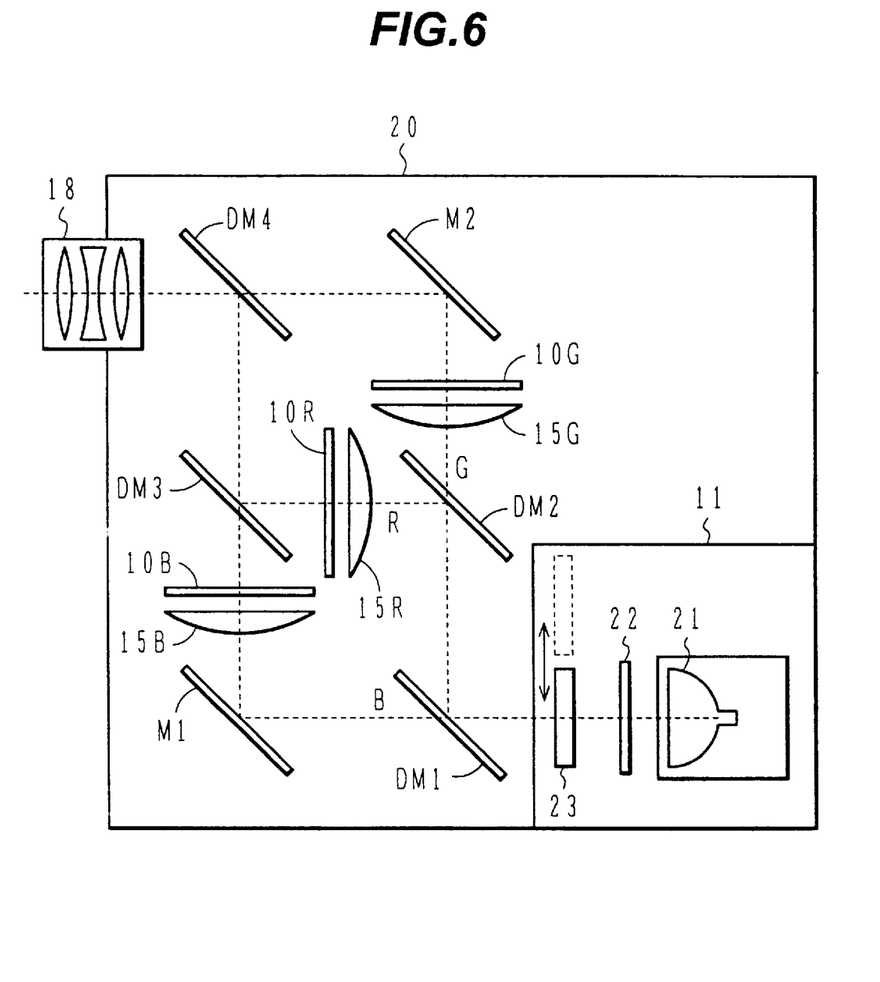
FIG. 6 is a schematic plan view briefly showing the structure of a three-plane type color liquid crystal display device according to an embodiment of the invention.

FIG. 6 is a schematic diagram showing the structure of a three-plane type color liquid crystal display device. This liquid crystal display device 20 includes a light source 11, a projecting lens 18 and three liquid crystal display elements 10G, 10B and 10R.

The light source 11 is constituted of a lamp 21, an ultraviolet/infrared cut filter 22 and a dichroic filter 23. Parallel light fluxes supplied from the light source are separated into two components by a dichroic mirror DM1. The blue color components B transmit through the dichroic mirror DM1, are reflected by a total reflection mirror Ml, and converged by a condenser lens 15b to enter the blue color liquid crystal display element 10B.

The green and red color components are reflected by the dichroic mirror DM1, and applied to a next dichroic mirror DM2. The dichroic mirror DM2 transmits the green color components therethrough and reflects the red color components thereat. The red color components R are condensed by a red color condenser lens 15R to enter the red color liquid crystal display element 10R.

The green color components G are condensed by a condenser lens 15G to enter the green color liquid crystal display element 10G.

Light output from the green color liquid crystal display element 10G is reflected by a total reflection mirror M2, transmitted through a dichroic mirror DM4, and enter the projecting lens 18. A red color image output from the red color liquid crystal display element 10R is reflected by the dichroic mirrors DM3 and DM4 to enter the projecting lens 18.

Light output from the blue color liquid crystal display element 10B is transmitted through the dichroic mirror DM3, and reflected by the dichroic mirror DM4 to enter the projecting lens 18.

In the above manner, three RGB liquid crystal display elements are used, incident light separated into three colors is spatially modulated and again synthesized so that a color image can be projected onto a screen.

Figure 7A:
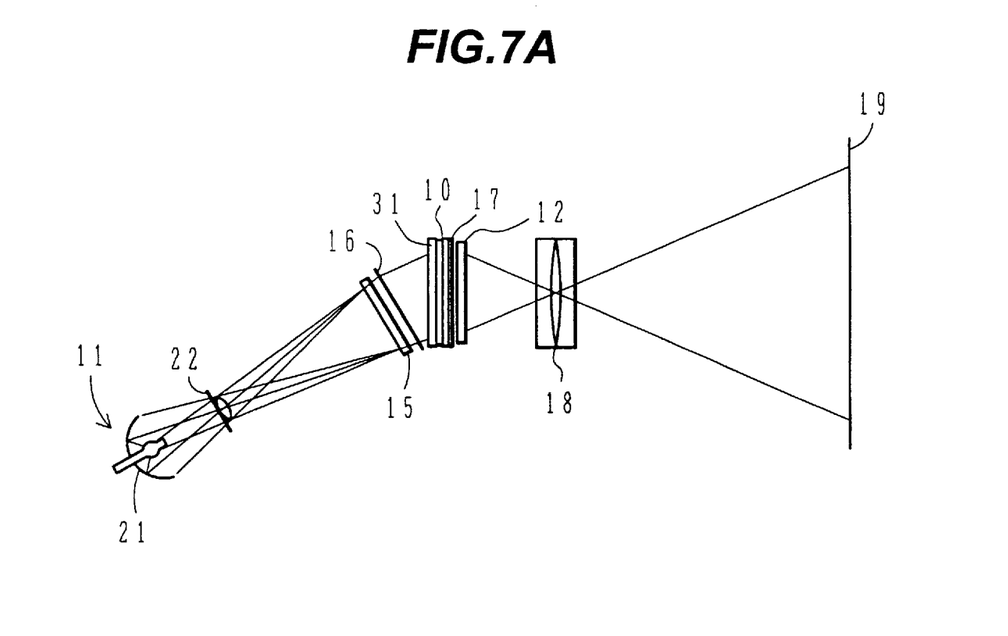
FIGS. 7A and 7B are a schematic plan view and a partially enlarged view showing the structure of a single plane type monochrome liquid crystal display device according to an embodiment of the invention.
Figure 7B:
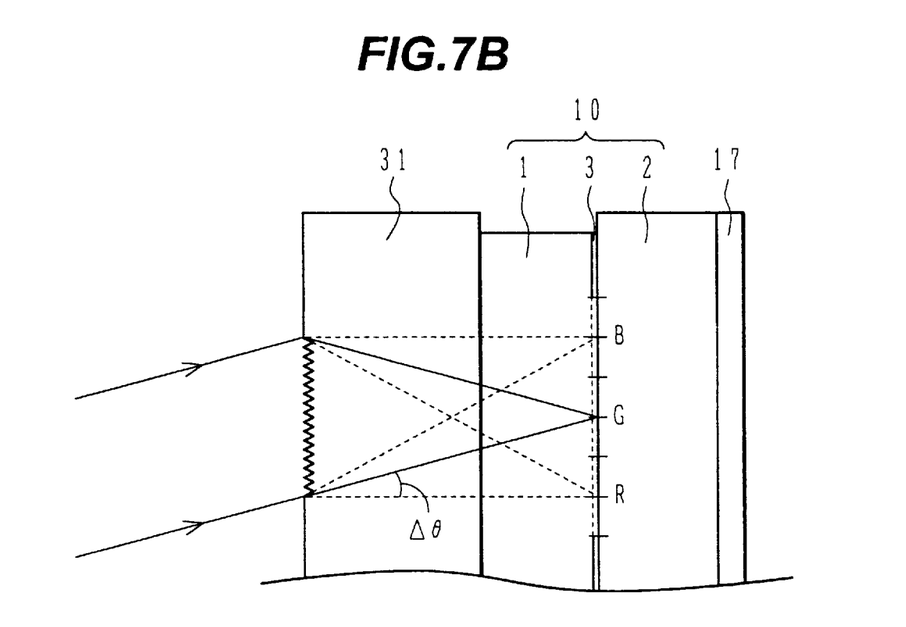

FIGS. 7A and 7B show the structure of an optical system realizing a color display by using a single plane liquid crystal element. FIG. 7A is a plan view of the liquid crystal display device, and FIG. 7B is a partially enlarged view of the device. Although this liquid crystal element is of a single plane, the structure different from FIG. 5 is adopted so that the liquid crystal display element 10 does not require a color filter.

A light source includes a lamp 21 and a filter 22, and has the structure same as that shown in FIG. 6. In this structure, white light itself is supplied to the liquid crystal display element 10 via a condenser lens 15, a polarizer 16 and a hologram element 31.

As shown in FIG. 7B, the liquid crystal display element 10 is formed by a pair of glass substrates 1 and 2 sandwiching a liquid crystal layer 3. In the horizontal direction, blue, green and read cells are juxtaposed. Namely, the liquid crystal display element 10 is configured to receive incidence light which is color-separated in the horizontal direction.

The hologram element 31 is an element which performs color resolution and light condensation by using a hologram function. White color light incident upon the hologram element 31 is angle-resolved into blue, green and red color components and condensed to enter the blue, green and red cells B, G and R of the liquid crystal display element 10.

Light output from the liquid crystal display element 10 is incident via a polarizer 17 upon a Fresnel lens 12 to be supplied to a projecting lens 18. The projecting lens 18 projects the supplied three-color components onto a screen 19 to form a color image.

In the above description, incident light having a constant angle of incidence along a predetermined direction relative to the normal to the liquid crystal display element has been used. However, if the electronic circuit structure of a liquid crystal display is changed, light broadened in an expanded area relative to the predetermined direction may also be used.

Figure 8A:
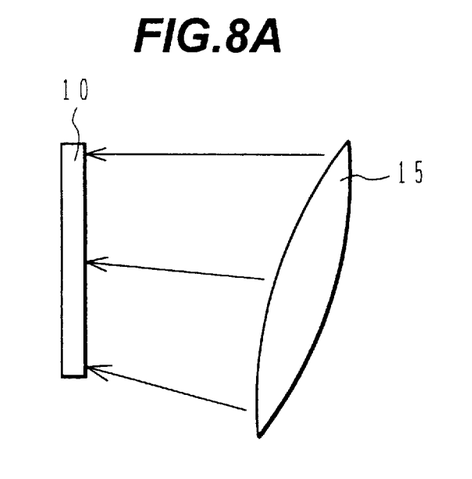
FIGS. 8A and 8B are a schematic cross sectional view and a circuit block diagram illustrating a liquid crystal display device according to another embodiment of the invention.
Figure 8B:
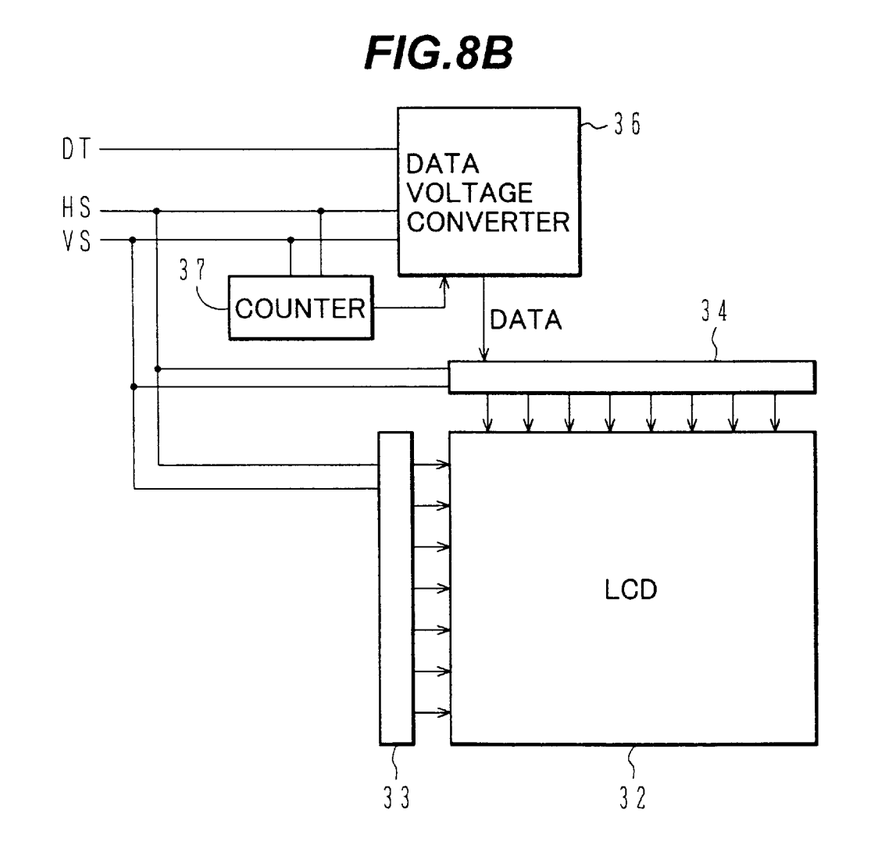

FIGS. 8A and 8B are schematic diagrams illustrating the structure of a liquid crystal display device according to another embodiment of the invention. In FIG. 8A, a condenser lens 15 supplies light fluxes converging in various directions to a liquid crystal display element 10. As compared to the structure shown in FIG. 1B, the angle θ of incidence in the vertical direction is not constant but is gradually changed in the vertical direction. However, the angle of incidence takes only a negative value in the vertical plane (drawing sheet surface) relative to the normal to the liquid crystal display element 10. More particularly, although the angle of incidence changes, only the characteristics that the transmission curve takes a local minimum such as shown in FIG. 1E are utilized. As the angle of incidence changes, the applied voltage at the local minimum of the transmission changes as shown in FIGS. 3A and 3B.

As shown in FIG. 8A, the condensing lens 15 supplies light fluxes converging in various directions to the liquid crystal display element 10. However, in this case, the angles of incidence as viewed from one point of the liquid crystal display element 10 are constant. In other words, the angles of incidence vary from point to point of the liquid crystal display element 10 in the vertical direction.

FIG. 8B is a circuit diagram of a driver circuit for driving the liquid crystal display element constructed as above. A display unit 32 having a number of liquid crystal cells disposed in a matrix shape is connected to a gate driver 33 for supplying an on/off signal in the horizontal direction and a data driver 34 for supplying an image signal of one horizontal line (row) in the vertical direction.

An image data signal DT for each row is supplied via a data voltage converter 36 to the data driver 34. The data voltage converter 36 receives an output of a counter 36 synchronously with a horizontal sync signal HS and a vertical sync signal VS.

The counter circuit 37 is reset when it receives the vertical sync signal VS, and counts a clock up or down each time the horizontal signal HS is received. It is therefore possible to know, from the output signal of the counter, which horizontal scan line (which position in the vertical direction) is being displayed on the display unit 32.

The position of the scan line on the display unit is one-to-one correspondence with the angle of incidence as shown in FIG. 8A. The data voltage converter 36 multiplies the image data DT by a predetermined coefficient changing with the position in the vertical direction to thereby generate a drive voltage corresponding to the position in the vertical direction on the display unit 32. With this arrangement, it is possible to supply illumination light broadened in an expanded area in both the vertical and horizontal directions and to achieve a uniform black display.

The present invention has been described in connection with the preferred embodiments. The invention is not limited only to the above embodiments. It will be apparent that various modifications, improvements, combinations, and the like can be made by those skilled in the art.

What is claimed is:

1. A liquid crystal display device, comprising:
   a liquid crystal spatial modulating element holding a liquid crystal layer between a pair of parallel substrates, wherein transmission of light incident upon the liquid crystal layer along an incidence direction tilted to a predetermined direction from a normal to the substrates takes a local minimum as a voltage applied to the liquid crystal layer is changed, and the voltage at the local minimum changes as the incidence direction is changed;
   an illumination optical system for supplying illumination light fluxes generally over a whole surface of said liquid crystal spatial modulating element along incidence direction or directions tilted to said predetermined direction; and
   a driver circuit capable of applying a voltage across the liquid crystal layer, the voltage being generally equal to a voltage which provides the local minimum of the transmission with respect to the illumination light.

2. A liquid crystal display device according to claim 1, wherein said illumination optical system supplies illumination light fluxes, each along an incidence direction which is changed with a position on said liquid crystal spatial modulating element.

3. A liquid crystal display device according to claim 2, wherein said drive circuit applies a voltage which is changed with a position on said liquid crystal spatial modulating element.

4. A liquid crystal display device according to claim 1, wherein said illumination optical system supplies illumination light fluxes having angles of incidence broadened in an expanded angle area with respect to a direction perpendicular to said predetermined direction.

5. A liquid crystal display device according to claim 1, further comprising a field lens disposed generally in parallel to the pair of parallel substrates of said liquid crystal spatial modulating element on a side opposite to said illumination optical system, said field lens having rotation symmetric characteristics and a center of rotation symmetry being eccentric to an areal center.

6. A liquid crystal display device according to claim 1, wherein an optical axis of said illumination optical system and progressing directions of the illumination light fluxes are generally parallel with respect to said predetermined direction.

7. A liquid crystal display device according to claim 1, wherein said illumination optical system includes a white color light source and a spectral element for angle-resolving white color light into light of three primary colors, a direction along which the light of three primary colors is angle-resolved being generally perpendicular to said predetermined direction.

8. A liquid crystal display device according to claim 7, wherein said spectral element is a hologram element.

9. A liquid crystal display device according to claim 1, wherein said liquid crystal spatial modulating element has a normally-white type structure or a structure not having a spacer in a light transmission area.

10. A liquid crystal display device according to claim 1, wherein said illumination optical system supplies illumination light fluxes having a constant tilt angle when projected on a first imaginary plane including a normal of said substrates and said predetermined direction.

11. A liquid crystal display device according to claim 10, wherein said illumination light fluxes are parallel to one another.

12. A liquid crystal display device according to claim 10, wherein said illumination light fluxes have propagation directions distributed in a range of angles when projected on a second imaginary plane perpendicular to said first imaginary plane and to said substrates.

13. A projector comprising a liquid crystal display device for forming an optical image output and a projecting optical system for projecting the optical image output from said liquid crystal display device, said liquid crystal display device comprising:
   a liquid crystal spatial modulating element holding a liquid crystal layer between a pair of parallel substrates, wherein transmission of light incident upon the liquid crystal layer along an incidence direction tilted to a predetermined direction from a normal to the substrates takes a local minimum as a voltage applied to the liquid crystal layer is changed, and the voltage at the local minimum changes as the incidence direction is changed;
   an illumination optical system for supplying illumination light fluxes generally over a whole surface of said liquid crystal spatial modulating element along incidence direction or directions tilted to said predetermined direction; and
   a driver circuit capable of applying a voltage across the liquid crystal layer, the voltage being generally equal to a voltage which provides the local minimum of the transmission with respect to the illumination light.

14. A projector according to claim 13, wherein said illumination optical system supplies illumination light fluxes, each along an incidence direction which is changed with a position on said liquid crystal spatial modulating element.

15. A projector according to claim 14, wherein said drive circuit applies a voltage which is changed with a position on said liquid crystal spatial modulating element.

16. A projector according to claim 13, wherein said projecting optical system further comprises a field lens disposed generally in parallel to the pair of parallel substrates of said liquid crystal spatial modulating element on a side opposite to said illumination optical system, said field lens having rotation symmetric characteristics and a center of rotation symmetry being eccentric to an areal center.

17. A projector according to claim 13, wherein said illumination optical system includes a white color light source and a spectral element for angle-resolving white color light into light of three primary colors, a direction along which the light of three primary colors is angle-resolved being generally perpendicular to said predetermined direction.

18. A projector according to claim 17, wherein said spectral element is a hologram element.

19. A projector according to claim 13, wherein said liquid crystal spatial modulating element has a normally-white type structure or a structure not having a spacer in a light transmission area.

20. A projector according to claim 13, wherein said illumination optical system supplies illumination light fluxes having a constant tilt angle when projected on a first imaginary plane including a normal of said substrates and said predetermined direction.

* * * * *